United States Patent
Leobandung

(10) Patent No.: US 10,891,368 B2
(45) Date of Patent: *Jan. 12, 2021

(54) DYNAMIC EMBEDDED INTEGRATED CIRCUIT IN TRACKABLE ITEM

(71) Applicant: International Business Machines Corporation, Armonk, NY (US)

(72) Inventor: Effendi Leobandung, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/274,973

(22) Filed: Feb. 13, 2019

(65) Prior Publication Data

US 2019/0180024 A1 Jun. 13, 2019

Related U.S. Application Data

(63) Continuation of application No. 15/469,005, filed on Mar. 24, 2017, now Pat. No. 10,311,225.

(51) Int. Cl.
*G06F 21/44* (2013.01)
*G06F 21/64* (2013.01)
*G06F 21/45* (2013.01)
*G06F 21/60* (2013.01)

(52) U.S. Cl.
CPC .......... *G06F 21/44* (2013.01); *G06F 21/45* (2013.01); *G06F 21/602* (2013.01); *G06F 21/64* (2013.01)

(58) Field of Classification Search
CPC ....................................................... G06F 21/44
See application file for complete search history.

(56) References Cited

U.S. PATENT DOCUMENTS

| | | | | |
|---|---|---|---|---|
| 8,866,594 | B1* | 10/2014 | Diorio | G06K 7/10297 340/10.42 |
| 8,941,469 | B1* | 1/2015 | Diorio | H04L 9/3247 340/10.1 |
| 9,417,042 | B2 | 8/2016 | Klaes et al. | |
| 9,460,573 | B1* | 10/2016 | Cordes | G06K 7/10138 |
| 9,501,675 | B1* | 11/2016 | Diorio | H04L 9/0816 |
| 9,792,472 | B1* | 10/2017 | Robshaw | H04L 9/3271 |
| 9,940,490 | B1* | 4/2018 | Robshaw | G06K 7/10257 |
| 10,222,417 | B1* | 3/2019 | Garg | G06F 1/08 |

(Continued)

OTHER PUBLICATIONS

"Are you Ready for RFID Chips Built into your Money and Documents?," North Dakota State University, http://www.kurzweilai.net/are-you-ready-for-rfid-chips-built-into-your-money-and-documents, May 7, 2013, 1 page.

(Continued)

*Primary Examiner* — Bradley W Holder
(74) *Attorney, Agent, or Firm* — L. Jeffrey Kelly; Ryan, Mason & Lewis, LLP

(57) ABSTRACT

A method for determining the authenticity of a trackable item is provided. The method includes maintaining a database including first scan history data associated with a given integrated circuit associated with a given item. Second scan history data associated with the given integrated circuit is received. An authenticity of the given item is determined based on a comparison of the first scan history data to the second scan history data.

20 Claims, 6 Drawing Sheets

(56) References Cited

U.S. PATENT DOCUMENTS

| | | | |
|---|---|---|---|
| 2002/0005774 A1* | 1/2002 | Rudolph | G06F 21/35 340/5.61 |
| 2004/0100363 A1* | 5/2004 | Lane | G07F 7/08 340/5.86 |
| 2005/0061879 A1* | 3/2005 | Honda | G07C 5/008 235/385 |
| 2006/0022799 A1* | 2/2006 | Juels | G06K 7/0008 340/10.1 |
| 2007/0035381 A1* | 2/2007 | Davis | G06K 19/0723 340/10.1 |
| 2007/0094152 A1* | 4/2007 | Bauman | G06Q 20/12 705/67 |
| 2007/0136583 A1* | 6/2007 | Diorio | G06Q 10/08 713/168 |
| 2007/0136584 A1* | 6/2007 | Diorio | G06Q 10/087 713/168 |
| 2007/0136585 A1* | 6/2007 | Diorio | G06Q 30/06 713/168 |
| 2010/0011211 A1* | 1/2010 | Anemikos | H04L 9/3226 713/168 |
| 2014/0057646 A1 | 2/2014 | Vaananen | |
| 2014/0069997 A1 | 3/2014 | Eldefrawy et al. | |
| 2014/0093144 A1* | 4/2014 | Feekes | H04W 12/06 382/124 |
| 2016/0093165 A1 | 3/2016 | Panambur et al. | |

OTHER PUBLICATIONS

"RFID Banknotes," https://www.fleur-de-coin.com/eurocoins/banknote-rfid, Mar. 2013, 3 pages.

Wikipedia, "Radio-Frequency Identification," https://en.wikipedia.org/wiki/Radio-frequency_identification, Mar. 21, 2017, 20 pages.

Winston Chai, "Radio ID Chips May Track Banknotes," Special to CNET News.com, https://www.cnet.com/news/radio-id-chips-may-track-banknotes/, May 22, 2003, 2 pages.

Rizomiliotis et al., "Security analysis of the song-mitchel authentication protocol for low-cost RFID tags," IEEE Communications Letters, Apr. 2009, pp. 274-276, vol. 13, Issue 4.

Song et al., "RFID authentication protocol for low-cost tags", Proceedings WiSec '08 Proceedings of the first ACM conference on Wireless network security, Mar. 31-Apr. 2, 2008, pp. 140-147.

List of IBM Patents or Patent Applications Treated as Related.

* cited by examiner

DYNAMIC EMBEDDED INTEGRATED CIRCUIT IN TRACKABLE ITEM

BACKGROUND

Wireless transmission-enabled integrated circuits (chips) such as, for example, radio frequency identification (RFID) chips, have been used for identification in many industries for a multitude of reasons. Such reasons include, for example, tracking parts through an assembly line, tracking pharmaceuticals through warehouses, and tracking product shipments. Further, RFID chips have even been implanted into livestock and pets allowing positive identification of the animals. Still further, in attempts to prevent counterfeiting of currency and money laundering, several institutions such as, for example, the European Central Bank (ECB), engaged in a project to embed RFID chips into their currency. In theory, the embedded RFID chip could make it very difficult for counterfeiters to produce counterfeit bills. Still further, the embedded RFID chip could help to prevent money laundering by giving law enforcement agencies a way of tracking the money in illegal transactions. These embedded RFID chips generally contain a fixed secure code which is transmitted back to an RFID reader upon activation by an RF signal. However, this method is not completely secure in that a clone chip can be produced capable of transmitting the same fixed secure code.

SUMMARY

Illustrative embodiments provide for the use of dynamic embedded chips in trackable items such as, but not limited to, currency.

For example, in one illustrative embodiment, a method for determining the authenticity of a trackable item is provided. The method includes maintaining a database including first scan history data associated with a given integrated circuit associated with a given item. Second scan history data associated with the given integrated circuit is received. An authenticity of the given item is determined based on a comparison of the first scan history data to the second scan history data.

For example, in another illustrative embodiment, a system to authenticate a trackable item is provided. The system comprises a given integrated circuit associated with a given item, a scanner, and a central database configured to maintain first scan history data associated with the given integrated circuit. The scanner is configured to transmit second scan history data associated with the given integrated circuit to the central database. The central database is further configured to determine an authenticity of the given item based on a comparison of the first scan history data to the second scan history data.

For example, in yet another illustrative embodiment, an apparatus comprising an item and an integrated circuit embedded in the item is provided. The integrated circuit is configured to: dynamically store scan history data associated with the integrated circuit each time the integrated circuit is scanned; and, in response to a scanner performing a current scan of the integrated circuit, transmit the stored scan history data to the scanner. The stored scan history data is used to determine an authenticity of the item based on a comparison of the stored scan history data to scan history data maintained at a database.

Advantageously, illustrative embodiments provide for an integrated circuit (chip) embedded in a trackable item (e.g., a currency item such as a bill) that is configured to transmit data which changes each time the chip is read based on a record of one or more of where, when, and how many times it was read.

These and other exemplary embodiments of the invention will be described in or become apparent from the following detailed description of exemplary embodiments, which is to be read in connection with the accompanying drawings.

DETAILED DESCRIPTION

Illustrative embodiments will now be described with regard to a system configured to determine the authenticity of a trackable item, i.e., a currency item such as a bill. While the examples described in the illustrative embodiments relate to currency, it is to be appreciated that embodiments of the invention are not limited to currency items but rather are more generally applicable to other trackable items such as, but not limited to, computer components, medical components, and any other items sought to be tracked to prevent false identity or authentication. Accordingly, the embodiments described herein should not be considered limited to the context of currency tracking and authentication.

Figure 1:
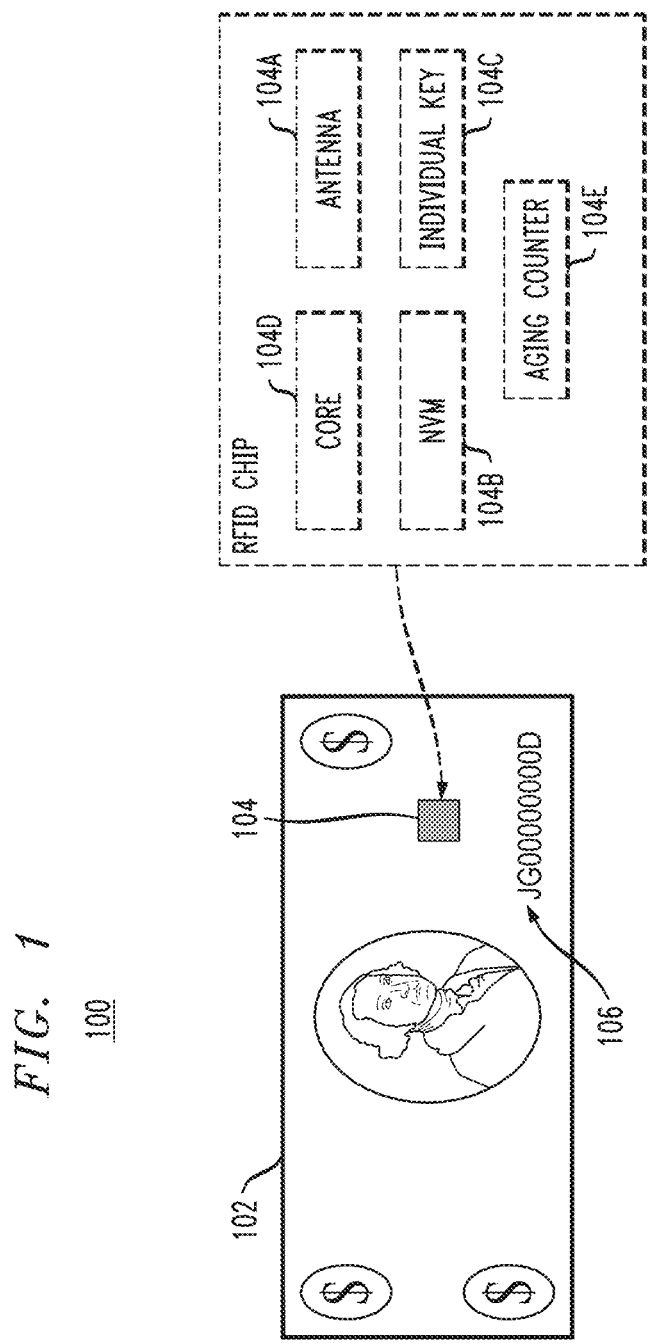
FIG. 1 illustrates components of a chip associated with an item, according to an embodiment of the invention.

FIG. 1 illustrates a block diagram 100 illustrating an item 102 having an embedded RFID chip. Although item 102 is shown as a currency bill, item 102 may be any item capable of being tracked with RFID technology, in accordance with the embodiments described herein.

As shown, item 102 includes chip 104 and unique identifier 106. In one embodiment, chip 104 is an RFID chip. Chip 104 may be embedded within item 102. In this exemplary embodiment of a currency bill, unique identifier 106 is a serial number of the currency bill. As shown, chip 104 may include antenna 104A enabling communication with the currency scanner and non-volatile memory (NVM) 104B to store data, such as scan history data associated with chip 104 (e.g., a current scan and one or more previous scans of chip 104). In one embodiment, the scan history data is dynamically stored each time chip 104 is scanned. That is, the scan history data stored in NVM 104B is updated each time chip 104 is scanned.

Chip 104 may further include individual key 104C. Individual key 104C is a unique digital code word associated with currency bill 102. In one embodiment, individual key 104C is initially determined based at least in part on unique identifier 106. Individual key 104C is programmed into chip 104 prior to the circulation or distribution of item 102, and may be stored in NVM 104B. Chip 104 may further include core 104D for processing data. In one embodiment, core 104D utilizes individual key 104C to encrypt data stored on chip 104. In one embodiment, and as shown, chip 104 further includes aging counter 104E that maintains a record of how many times chip 104 has been scanned.

Although the various components of chip 104 are depicted as individual components, the components of chip 104 may, in other embodiments, be arranged within a single component, or as a combination of individual components and sub-combinations of components. Accordingly, the illustration of the components of chip 104 in FIG. 1 is not to be considered limiting.

Figure 2:
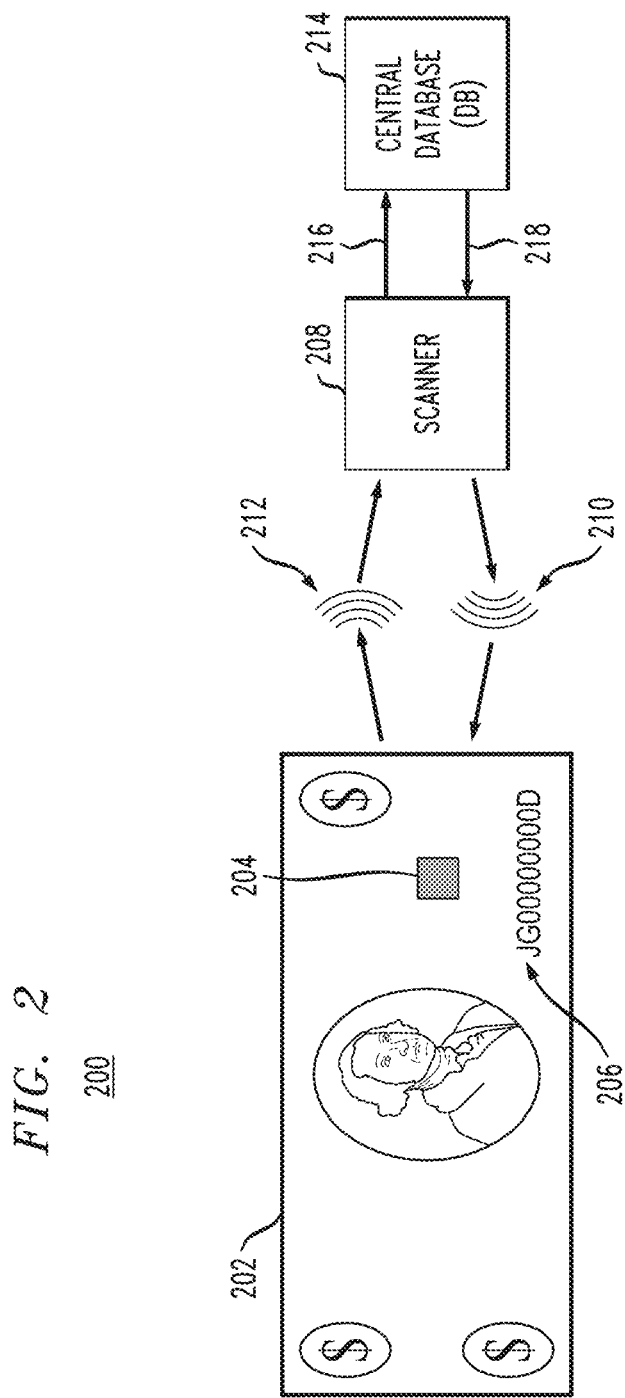
FIG. 2 illustrates a system environment to determine the authenticity of an item, according to an embodiment of the invention.

FIG. 2 illustrates an exemplary authentication system 200. As shown, system 200 includes item 202, depicted in this illustrative example as a currency bill. Item 202 is shown comprising chip 204 (e.g., an RFID chip) and unique identifier 206 (e.g., a serial number of the currency bill).

System 200 further includes scanner 208, which may be an RFID scanner. However, any type of chip/scanner technology may be utilized in accordance with the embodiments described herein. In this illustrative embodiment of a currency bill, scanner 208 is a currency scanner. Scanner 208 may be made relatively inexpensive and may be made available at all places of business such as banks, retail stores, etc.

Scanner 208 is configured to scan chip 204. In one embodiment, scanner 208 initiates communication with chip 204 by transmitting signal 210 to chip 204 (e.g., an RF signal). Signal 210 may include data corresponding to details associated with the scan. In one embodiment, the data included in signal 210 comprises location data and temporal data. Location data may include data indicative of a location where chip 204 is being scanned (e.g., longitude and latitude data), and the temporal data may include data indicative of when chip 204 is being scanned (e.g., date and time data). The data included in RF signal 210 is then stored in chip 204. Thus, each time chip 204 is scanned, the current scan data will be stored in chip 204 along with the previous scan data associated with one or more previous scans of item 202. Accordingly, scan history data of chip 204 is dynamically stored each time chip 204 is scanned.

Chip 204 may additionally store data indicative of how many times it has been scanned. For example, chip 204 may comprise sufficient memory to store data for the last 1,000 to 1,000,000 times it has been scanned. Accordingly, a scan history associated with item 202 is chronicled within chip 204.

Upon activation of chip 204 by receiving RF signal 210, chip 204 is configured to generate a response RF signal 212, which is transmitted back to scanner 208. In one embodiment, response RF signal 212 comprises data stored in chip 204. The data included in response RF signal 212 may comprise encrypted scan history data of item 202, which may include an encrypted version of the current scan data and the previous scan data. The scan history data may be encrypted prior to transmission of a response RF signal 212 using the individual key associated with item 202. For example, chip 204 may be configured to encrypt all of its data up to the last 1,000 to 1,000,000 times it was scanned, and transmit the encrypted data to scanner 208 via RF signal 212.

System 200 further includes central database (central DB) 214. Central DB 214 is configured to maintain a database comprising data associated with one or more chips associated with one or more respective items. In this illustrative embodiment, central DB 214 may be located at a computer operations center for monitoring currency. Accordingly, central DB 214 is configured to store data associated with each scan of item 202, thereby maintaining a record of location data and temporal data corresponding to item 202, as well as a count of how many times that item 202 is scanned (i.e., an aging counter).

Scanner 208 is configured to transmit data 216 to central DB 214 over a communications network, such as the Internet. Data 216 comprises the data included in response RF signal 212. In one embodiment, data 216 further comprises auxiliary data associated with item 202. The auxiliary data may comprise unique identifier 206.

Central DB 214 is further configured to determine an authenticity of item 202 based on an analysis of data 216 received from scanner 208. To do this, central DB 214 decrypts data 216. In one embodiment, central DB 214 decrypts data 216 using the individual key for item 202. For example, central DB 214 may derive the individual key for item 202 based at least in part on the auxiliary data (e.g., unique identifier 206). Central DB 214 compares the decrypted data to the data maintained in the database for chip 204. Based on the comparison, DB 214 determines whether or not item 202 is authentic. Further details regarding determining the authenticity of item 202 will be discussed below with reference to FIG. 3. Accordingly, the path of an item through space and time, such as a currency bill, may be monitored in order to determine, in real or near-real time, whether or not the item is authentic.

Central DB 214 is further configured to transmit results 218 of the determination to scanner 208. For example, results 218 may indicate whether the item is authentic or inauthentic. If results 218 indicate that item 202 is inauthentic, scanner 208 may be configured to generate an alert informing an operator that item 202 may be inauthentic so that the operator could take appropriate remedial action. In one embodiment, if results 218 indicate that item 202 is authentic, scanner 208 may be configured to generate a confirmation that item 202 is authentic.

Figure 3:
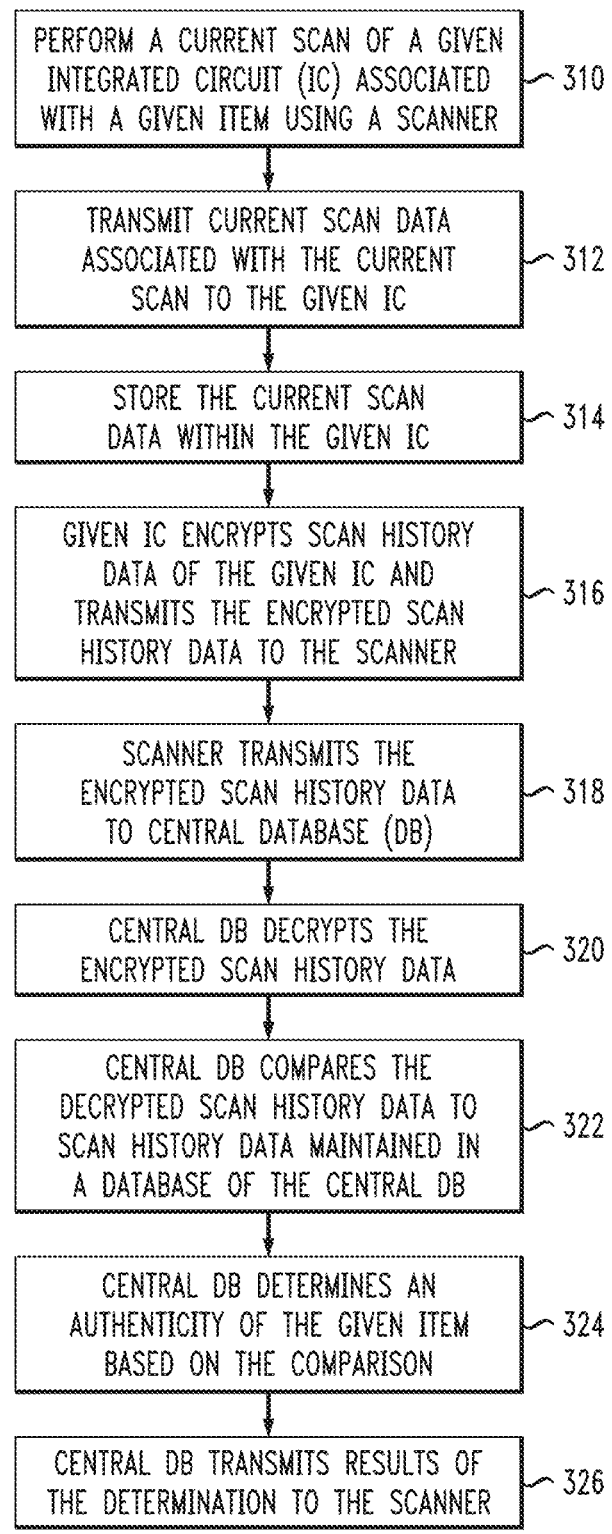
FIG. 3 illustrates a methodology for determining authenticity of a currency item, according to an embodiment of the invention.

FIG. 3 illustrates a flow chart depicting an exemplary process 300 for authenticating an item.

At step 310, a current scan of an integrated circuit (i.e., chip) associated with an item is performed using a scanner. The chip may be embedded within the item. For example, the chip may be an RFID chip that is scanned using an RFID scanner. However, any type of chip/scanner technology may be utilized in accordance with the embodiments described herein.

At step 312, the scanner transmits current scan data associated with the current scan to the chip. The current scan data may include location data associated with a location at which the current scan is taking place (e.g., latitude and longitude data), and temporal data associated with a time at which the current scan is taking place (e.g., date and time data).

As shown in step 314, the current scan data is stored within the chip. The chip may also store previous scan data associated with a history of previous scans. For example, the second scan data may contain location and temporal data for each previous scan of the chip, along with how many times it has been scanned. Accordingly, the chip maintains scan history data comprising current scan data and previous scan data.

At step 316, the chip encrypts the scan history data and transmits the encrypted scan history data to the scanner. In one embodiment, the chip encrypts the scan history data utilizing an individual key associated with the chip. For example, in the case of a currency item, the individual key may be a key derived from a unique identifier associated with the item (e.g., a serial number associated with a currency bill). Accordingly, the individual key is a unique key associated with the item.

At step 318, the scanner transmits the encrypted scan history data to a central database (central DB). In one embodiment, the encrypted scan history data is transmitted to the central DB with auxiliary data used for decrypting the encrypted scan history data. In one embodiment, the auxiliary data comprises the unique identifier associated with the item.

At step 320, the central DB decrypts the encrypted scan history data. In one embodiment, the decryption comprises deriving the individual key for the item based on the auxiliary data. For example, in the case of a currency item, the central DB derives the individual key for the currency item using the serial number of the currency item.

The central DB is configured to maintain its own scan history data associated with previous scans of the item in a database. At step 322, the central DB compares the decrypted scan history data to the scan history data maintained in the database. In one embodiment, the comparison comprises comparing the current scan data with at least a portion of the scan history data maintained in the database. For example, the comparison may comprise comparing one or more of the location and temporal data of the current scan with the location and temporal data of the last scan performed on the chip.

At step 324, the central DB determines an authenticity of the item based on the comparison, such as by determining whether to accept or reject the item as authentic. That is, the central DB is configured to determine whether or not the item is original or a duplicate. In the case of a currency item, the central DB determines whether or not the currency item is counterfeit. For example, if the comparison of the decrypted scan history data to the scan history data maintained in the database determines that the location and/or time of the current scan varies unreasonably from that of the previous scan, the central DB may determine at step 324 that the item is not authentic (e.g., duplicated). The embodiments described herein may also be used to flag illegal use of the currency, such as money laundering. Accordingly, the central DB is configured to track items and analyze the authenticity of the items in real time or near real-time.

In one embodiment, determining the authenticity of the item comprises flagging the item as inauthentic in response to determining that a difference between the location of the current scan and the location of the last scan performed prior to the current scan exceeds a distance threshold. For example, if the chip associated with the item was last scanned yesterday in Singapore and today it was scanned in Beijing, the central DB would determine that the item is a duplicate since it would be nearly impossible for the item to travel that far in such a short amount of time.

In one embodiment, determining the authenticity of the item comprises flagging the item as inauthentic in response to determining that a difference between the time of the current scan and a time of the last scan performed prior to the current scan exceeds a time threshold. For example, if the time threshold is set for 100 days, the central DB may flag the item as being under suspicion as being held and/or duplicated if the time between consecutive scans exceeds 100 days.

At step 326, the central DB transmits results of the determination back to the scanner. As discussed above, the results include a determination as to the authenticity of the item.

The data transmitted by each chip described herein is unique since the data for a given chip is determined based on how many times it has been scanned, where it has been scanned and/or when it has been scanned, etc., thereby making it prohibitively expensive to manufacture multiple unique fake chips. Thus, the embodiments described herein advantageously increase the difficulty in cloning chips, since the data associated with the chip "ages" with each scan and fake chips would be immediately detected upon scanning.

In other embodiments, a similar concept may also be implemented regarding other items, such as computer chips, medical devices, prescription drugs, and other objects that may be embedded with chips for tracking purposes.

Figure 4:
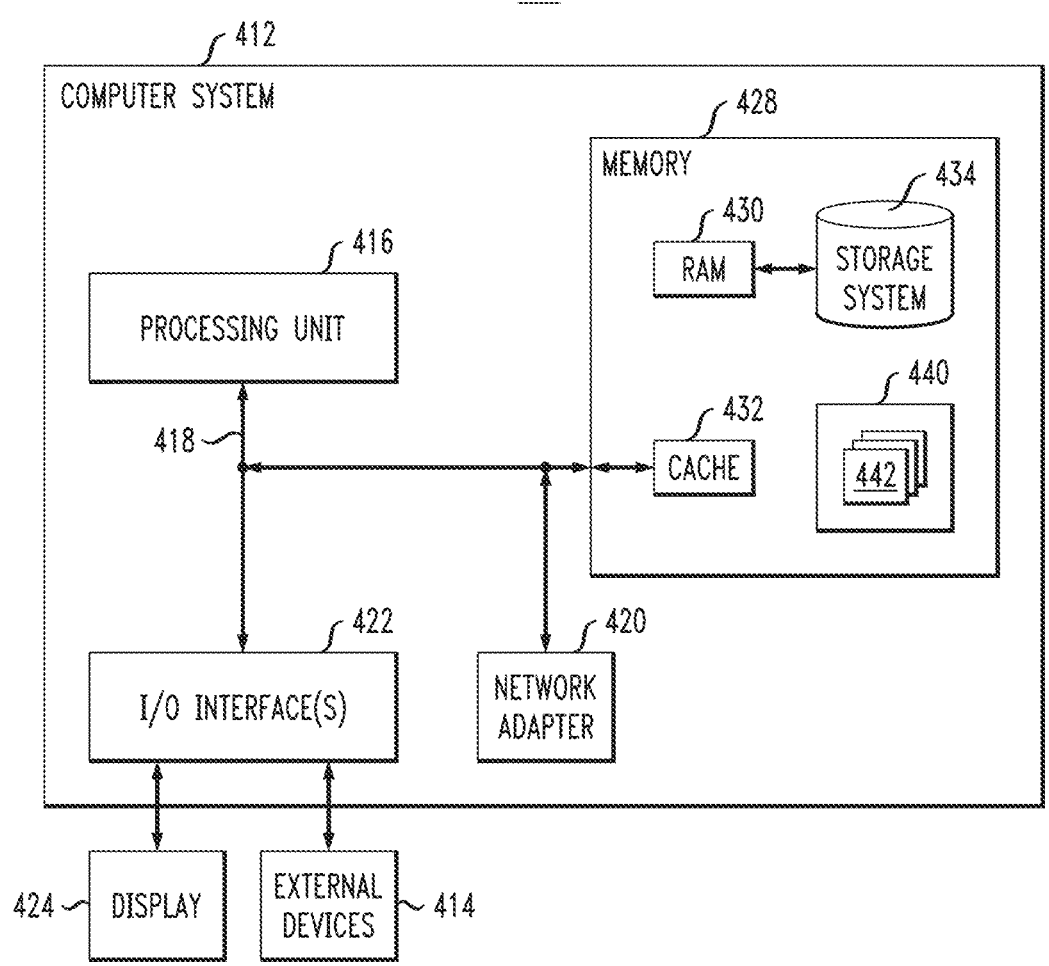
FIG. 4 depicts a computer system in accordance with which one or more components/steps of techniques of the invention may be implemented according to an embodiment of the invention.

One or more embodiments can make use of software running on a computer or workstation. With reference to FIG. 4, in a node 410 there is a system/server 412, which is operational with numerous other general purpose or special purpose computing system environments or configurations. Examples of well-known computing systems, environments, and/or configurations that may be suitable for use with system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each node in the computing platform 400 can implement the architecture shown in node 410.

System/server 412 may be described in the general context of computer system executable instructions, such as program modules, being executed by a computer system. Generally, program modules may include routines, programs, objects, components, logic, data structures, and so on that perform particular tasks or implement particular abstract data types. System/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, system/server 412 is shown in the form of a computing device. The components of system/server 412 may include, but are not limited to, one or more processors or processing units 416, system memory 428, and bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

System/server 412 typically includes a variety of computer system readable media. Such media may be any available media that is accessible by system/server 412, and it includes both volatile and non-volatile media, removable and non-removable media.

The system memory 428 can include computer system readable media in the form of volatile memory, such as random access memory (RAM) 430 and/or cache memory 432. System/server 412 may further include other removable/non-removable, volatile/nonvolatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces.

As depicted and described herein, memory 428 may include at least one program product having a set (e.g., at least one) of program modules that are configured to carry out the functions of embodiments of the invention. A program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

System/server 412 may also communicate with one or more external devices 414 such as a keyboard, a pointing device, an external data storage device (e.g., a USB drive), display 424, one or more devices that enable a user to interact with system/server 412, and/or any devices (e.g., network card, modem, etc.) that enable system/server 412 to communicate with one or more other computing devices. Such communication can occur via I/O interfaces 422. Still yet, system/server 412 can communicate with one or more networks such as a LAN, a general WAN, and/or a public network (e.g., the Internet) via network adapter 420. As depicted, network adapter 420 communicates with the other components of system/server 412 via bus 418. It should be understood that although not shown, other hardware and/or software components could be used in conjunction with system/server 412. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
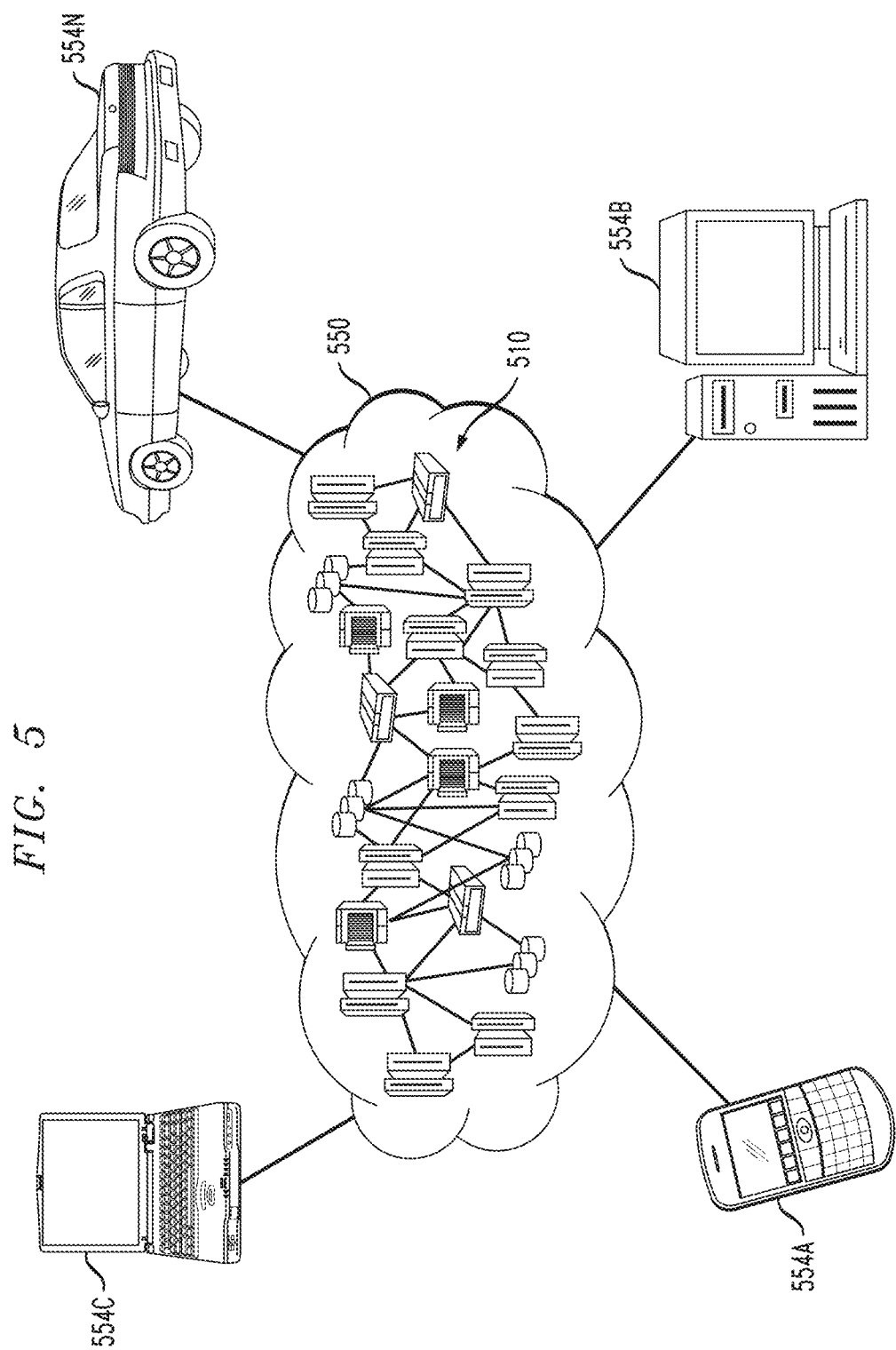
FIG. 5 depicts a cloud computing environment according to an embodiment of the invention.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
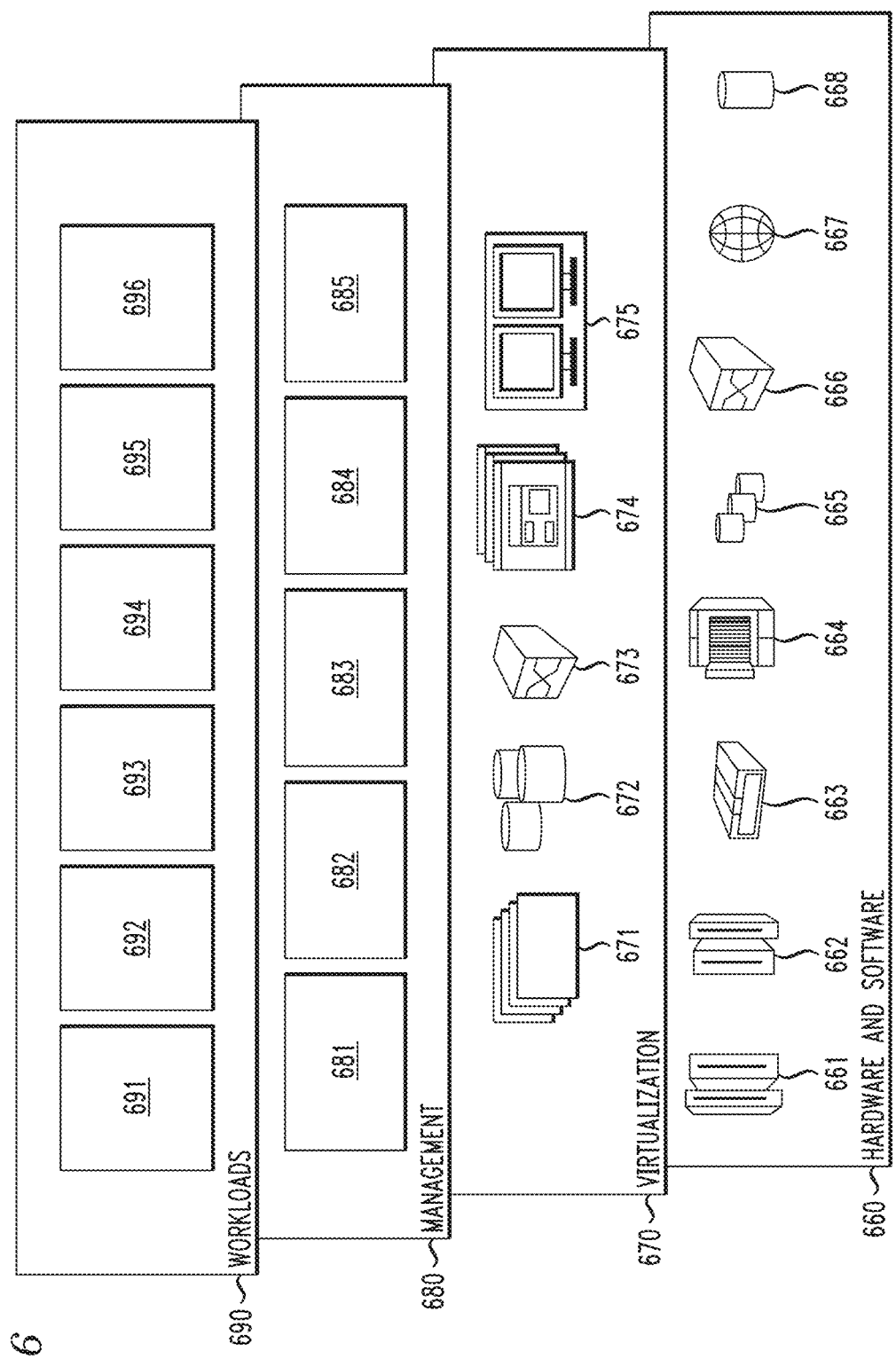
FIG. 6 depicts abstraction model layers according to an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: data capture 691; data analytics processing 692; data encryption support 693; currency validity assessment 694; database management support 695; and validation support 696, which may perform various functions described above.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although illustrative embodiments have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
   maintaining a database comprising first scan history data associated with a given integrated circuit associated with a given item;
   receiving second scan history data associated with the given integrated circuit; and
   determining an authenticity of the given item based on a comparison of the first scan history data to the second scan history data;
   wherein the second scan history data is received as encrypted second scan history data, and wherein determining the authenticity of the given item further comprises decrypting the encrypted second scan history data;
   wherein a key associated with the given item based on auxiliary data received with the second scan history data is generated, wherein the encrypted second scan history data is decrypted utilizing the generated key;
   wherein the auxiliary data comprises a unique identifier associated with the given item; and
   wherein the steps of the method are performed by at least one processing device comprising a processor coupled to a memory.

2. The method of claim 1, wherein the second scan history data is stored in the given integrated circuit each time the given integrated circuit is scanned.

3. The method of claim 2 wherein the second scan history data is dynamically stored in the given integrated circuit each time the given integrated circuit is scanned.

4. The method of claim 1, wherein the second scan history data comprises at least current scan data associated with a current scan of the given integrated circuit, and wherein the first scan history data comprises prior scan data associated with at least a scan of the given integrated circuit performed prior to the current scan.

5. The method of claim 4, wherein determining the authenticity of the given item comprises comparing the prior scan data to the current scan data.

6. The method of claim 5, wherein the prior scan data and the current scan data comprise respective indications of a time of when the prior scan and the current scan were each performed.

7. The method of claim 6, wherein determining the authenticity of the given item comprises flagging the given item as inauthentic in response to determining that a difference between the time of when the prior scan was performed and the time of when the current scan was performed exceeds a time threshold.

8. The method of claim 1, further comprising transmitting results of the determination to a scanner.

9. The method of claim 1, wherein the given integrated circuit is a radio frequency identification (RFID) integrated circuit.

10. The method of claim 1, wherein the given item is a currency item.

11. An article of manufacture comprising a processor-readable storage medium having encoded therein executable code of one or more software programs, wherein the one or more software programs when executed by at least one processor implement the steps of:
maintaining a database comprising first scan history data associated with a given integrated circuit associated with a given item;
receiving second scan history data associated with the given integrated circuit;
determining an authenticity of the given item based on a comparison of the first scan history data to the second scan history data;
wherein the second scan history data is received as encrypted second scan history data, and wherein determining the authenticity of the given item further comprises decrypting the encrypted second scan history data;
wherein a key associated with the given item based on auxiliary data received with the second scan history data is generated, wherein the encrypted second scan history data is decrypted utilizing the generated key; and
wherein the auxiliary data comprises a unique identifier associated with the given item.

12. The article of manufacture of claim 11, wherein the second scan history data comprises at least current scan data associated with a current scan of the given integrated circuit, and wherein the first scan history data comprises prior scan data associated with at least a scan of the given integrated circuit performed prior to the current scan.

13. The article of manufacture of claim 12, wherein determining the authenticity of the given item comprises comparing the prior scan data to the current scan data.

14. The article of manufacture of claim 13, wherein the prior scan data and the current scan data comprise respective indications of a time of when the prior scan and the current scan were each performed.

15. The article of manufacture of claim 14, wherein determining the authenticity of the given item comprises flagging the given item as inauthentic in response to determining that a difference between the time of when the prior scan was performed and the time of when the current scan was performed exceeds a time threshold.

16. An apparatus comprising:
at least one computer processor coupled to a memory and configured to:
maintain a database comprising first scan history data associated with a given integrated circuit associated with a given item;
receive second scan history data associated with the given integrated circuit;
determine an authenticity of the given item based on a comparison of the first scan history data to the second scan history data;
wherein the second scan history data is received as encrypted second scan history data, and wherein determining the authenticity of the given item further comprises decrypting the encrypted second scan history data;
wherein a key associated with the given item based on auxiliary data received with the second scan history data is generated, wherein the encrypted second scan history data is decrypted utilizing the generated key; and
wherein the auxiliary data comprises a unique identifier associated with the given item.

17. The apparatus of claim 16, wherein the second scan history data comprises at least current scan data associated with a current scan of the given integrated circuit, and wherein the first scan history data comprises prior scan data associated with at least a scan of the given integrated circuit performed prior to the current scan.

18. The apparatus of claim 17, wherein determining the authenticity of the given item comprises comparing the prior scan data to the current scan data.

19. The apparatus of claim 18, wherein the prior scan data and the current scan data comprise respective indications of a time of when the prior scan and the current scan were each performed.

20. The apparatus of claim 19, wherein determining the authenticity of the given item comprises flagging the given item as inauthentic in response to determining that a difference between the time of when the prior scan was performed and the time of when the current scan was performed exceeds a time threshold.

* * * * *